Aug. 20, 1935.          C. W. RYERSON          2,012,072
TIRE COVER
Original Filed April 2, 1931
FIG. 1
FIG. 2
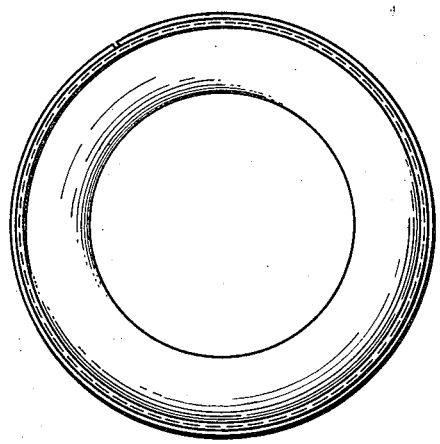
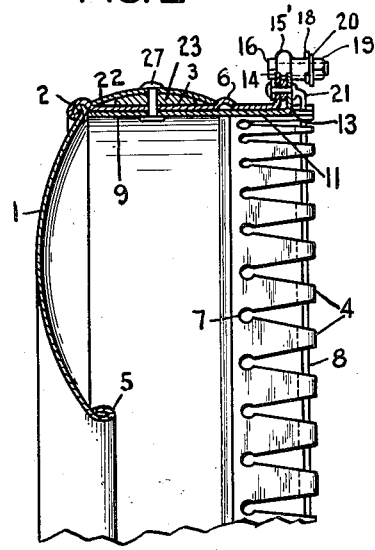
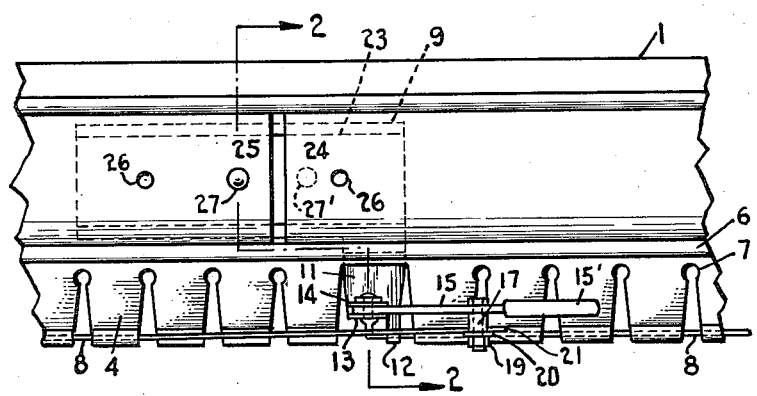
FIG. 3
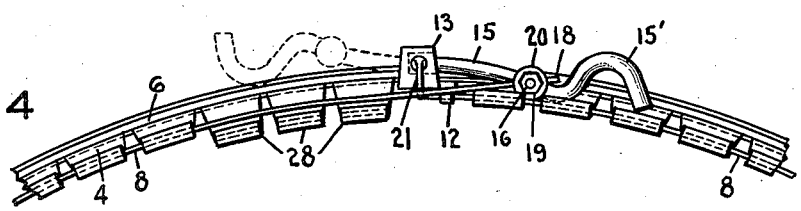
FIG. 4
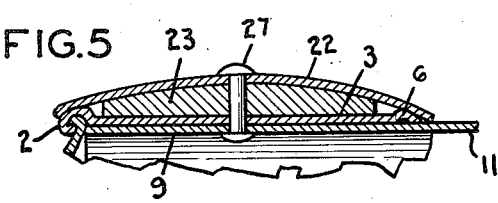
FIG. 5
INVENTOR-
Creighton W. Ryerson
BY
ATTORNEY- Patented Aug. 20, 1935

2,012,072

UNITED STATES PATENT OFFICE 2,012,072

TIRE COVER

Creighton W. Ryerson, Jackson, Mich., assignor to Ryerson & Haynes Inc., a corporation of Michigan Original application April 2, 1931, Serial No. 527,091. Divided and this application May 6, 1933, Serial No. 669,650

2 Claims. (Cl. 150—54)

This invention relates to tire covers and is a division of my application Serial No. 527,091, filed April 2, 1931 and patented May 30, 1933, No. 1,911,849.

One of the objects of the invention is to construct a metal tire cover with a reinforcing band to furnish additional rigidity.

Another object is to produce a more attractive looking cover by means of a band that may be metal plated or painted to contrast or harmonize with the rest of the tire or with the automobile on which the cover is to be used.

Other objects will appear in the following description, reference being had to the drawing in which:

Fig. 1 is an elevation of the tire cover, the handle being omitted.

Fig. 2 is a section through the cover taken on the irregular line 2—2 of Fig. 3.

Fig. 3 is a plan view of a portion of the upper part of the cover shown in Fig. 2.

Fig. 4 is an elevation of the upper part of the cover shown in Fig. 2 with the tightening lever in closed position.

Fig. 5 is a section through the band and a portion of the adjacent parts of a portion of a modified cover arrangement.

Referring to the drawing, the tire cover consists of a trough shaped ring 1 secured by an interlocking joint 2 or otherwise to an annular outer hoop portion 3 which has a series of serrations or fingers 4 on one edge as clearly shown in the figures.

The part 1 may have its edge bent back in the form of a bead at 5 to prevent wear of the tire or injury to the hands of the operator and also to strengthen the disc. The annular portion 3 may have a bead 6 to give it additional strength. This bead is positioned adjacent to the serrations 4 which may have rounded openings 7 at the bottom of the notch separating the serrations. The serrations 4 have their ends bent over to form channels to receive the expanding and contracting wire to be later referred to.

A stiffening plate 9 is riveted, welded or otherwise fastened beneath the annular member 3. This plate has an extension 11 projecting outwardly to the serrated edge 4 of the member or band 3. A portion of this extension 12 is bent over to form a channel to receive the wire 8 and the remainder is bent at right angles to form an ear 13.

Between the ears 13 and 14 is pivoted an operating handle 15 having a finger piece 15' and a binding post 17 spaced between the pivoted point and the finger piece. This binding post consists of a headed bolt 16 which passes through a flattened portion of the handle 15. A hole in this bolt is adapted to receive the end 18 of the tightening wire. On screwing down the nut 19 the washer 20 clamps the wire in the hole in the binding post.

The end 21 of the tightening wire 8 passes through holes in the ears 13 and 14 and is riveted therein by swaging the wire on each side of the ears. This end of the wire acts as a pivot point for the lever 15.

The strengthening hoop or band 22 is fitted between the seam and the bead 6 of the band 3, it being open ended for this purpose as shown in Fig. 2, or as shown in the modification of Fig. 5, the strengthening hoop 22 extends outside the seam 2 and bead 6. In this modification the hoop hides the bead and seam and exposes the hoop to view from the rear. This gives a pleasing effect as the hoop may be plated or arranged to contrast with the ring 1. To secure the hoop 22 tightly in place I spot weld, rivet or otherwise form a tongue 23 to the end 24. This tongue 23 is fastened on the under side of the end 24 and projects under the other end 25. To tightly grip the band 22 in place on the tire cover I provide two holes 26 therein to receive the prongs of a spanner or tightening tool. On moving these prongs together by sufficient application of power the ends 24 and 25 are brought closer together and the band tightly grips the annular member 3. A hole is then drilled or otherwise formed through the end 25, the tongue 23 therebeneath, the annular member 3 and the plate 9. The parts are then held in position by a rivet or other suitable fastener 27.

I may of course form the holes for the rivet in the separate parts before the hoop is applied to the member 3 but I prefer to make this rivet hole at least through the parts 23, 3 and 9 after the hoop 22 is clamped in position as this ensures that it will always be tightly positioned on the member 3.

To place the tire cover in position on a spare tire the finger piece 15' is grasped and the handle 15 rotated to the position shown in dotted lines in Fig. 4, the binding post 16 turning in the handle during this operation. This movement forces the wire 8 through the channels in the serrations 4 around the circumference of the cover and expands them so that the cover can be readily passed over the spare tire. The wire may not pass through a few of the serrations such as 28 to permit the wire 8 more readily to perform this expanding movement. These serrations, however, are quite flexible like the others and they offer no impediment to the placing of the cover on the tire. It is also permissible to leave this portion of the cover in solid form, that is, unserrated.

The handle 15 is then rotated in the opposite direction to the position shown in Fig. 4. This movement of the handle draws the wire 8 through the serrations 4 and forces them tightly down against the side of the tire. This holds the tire cover firmly in place.

As a further modification I have omitted the tongue portion 23. One then drills an additional hole through the hoop 22, the annular member 3 and the strengthening plate 9, after the band is drawn tightly in position as already described, and fastens a second rivet 27' therein.

Instead of using rivets 27 and 27' I may spot weld the ends 24 and 25 in place or otherwise fasten them tightly in place on the cover.

Instead of placing the hoop in position between the beads 2 and 6, I may construct it to overlap the same as shown in Fig. 5.

An advantage of my metallic tire cover is that it furnishes a stronger cover than the usual fabric cover, is free from the usual wrinkles of a fabric cover and may be metal plated, painted or otherwise decorated to harmonize or contrast with the finish of the automobile. The strengthening hoop 22 may be painted or metal plated differently from the remaining part of the tire cover in some cases and the use of this extra reinforcing hoop makes it easy to produce this contrast, particularly in case of metal plating. In such case the hoop 22 may be plated entirely separately from the other parts.

Having described my invention, what I claim is:

1. In tire covers, a hoop member adapted to be positioned on the tread of a tire, and having two peripheral beads spaced axially from each other and a transversely split metal band having its edges fitting against said beads, a tongue secured at one end to the underside of one end of said band and the other end projecting under the other end of said band and a rivet extending through the latter end, the said tongue and the said hoop, the single rivet being the only mechanical union between the band and hoop.

2. In tire covers, a hoop member adapted to be positioned on the tread of a tire, and having two peripheral beads spaced axially from each other and a transversely split metal band having its edges fitting against said beads, a tongue secured at one end to the underside of one end of said band and the other end projecting under the other end of said band and a rivet extending through the latter end, the said tongue and the said hoop, the single rivet being the only mechanical union between the band and hoop, said band having two holes adjacent the ends to receive tools for tightening the band in place on the hoop while said rivet is being applied.

CREIGHTON W. RYERSON.